United States Patent
Chiang

(10) Patent No.: US 6,980,893 B2
(45) Date of Patent: Dec. 27, 2005

(54) PHASE RECOVERY FILTERING TECHNIQUES FOR SCP THROUGHPUT SHORTAGE

(75) Inventor: Richard Y. Chiang, Torrance, CA (US)

(73) Assignee: The Boeing Company, Chicago, IL (US)

( * ) Notice: Subject to any disclaimer, the term of this patent is extended or adjusted under 35 U.S.C. 154(b) by 120 days.

(21) Appl. No.: 10/719,628

(22) Filed: Nov. 21, 2003

(65) Prior Publication Data
US 2005/0182529 A1 Aug. 18, 2005

(51) Int. Cl.$^7$ .............................................. G06F 19/00
(52) U.S. Cl. ..................... 701/13; 244/158 R; 375/326
(58) Field of Search ........................... 701/1, 13, 9, 10; 375/355, 359, 375, 376, 232, 326; 244/158 R

(56) References Cited

U.S. PATENT DOCUMENTS

| | | | | |
|---|---|---|---|---|
| 5,862,191 A | * | 1/1999 | Moridi | 375/355 |
| 6,031,880 A | * | 2/2000 | Li et al. | 375/326 |
| 6,650,699 B1 | * | 11/2003 | Tierno | 375/232 |

* cited by examiner

Primary Examiner—Tan Q. Nguyen
(74) Attorney, Agent, or Firm—Shimokaji & Associates, P.C.

(57) ABSTRACT

This invention introduces innovative filtering techniques to recover the instability phase margin loss due to time delay induced from a throughput shortage problem of a spacecraft central processor (SCP). This invention relates to digital control systems and, more particularly, to a phase recovery filtering technique to alleviate spacecraft central computer processor or (SCP) throughput shortages. This filtering technique recovers the unstable phase margin loss due to the time delay caused by the SCP throughput problem. The filtering techniques may be accomplished without schedule slip or extra cost to the project.

25 Claims, 7 Drawing Sheets

PHASE RECOVERY FILTERING TECHNIQUES FOR SCP THROUGHPUT SHORTAGE

GOVERNMENT RIGHTS

This invention was made with Government support. The government has certain rights in this invention.

BACKGROUND OF THE INVENTION

The present invention generally relates to digital control systems and, more particularly, to a phase recovery filtering technique to alleviate spacecraft central computer or spacecraft central processor (SCP) throughput shortages.

A SCP generally plays a crucial role in controlling a spacecraft's attitude, mode and phase, fault detection, actuators and sensors, and hardware components, for example. The increasing complexity of space missions requires more software to complete a successful mission. More software puts greater demands on the spacecraft's SCP. The SCP runs or implements the software. At a certain point, the SCP will run out of the processing time needed to execute all the instructions and computations asked of it at each real time-clock interrupt (RTI). Running out of the processing time needed causes a shortage known as the SCP throughput problem.

The SCP throughput problem has plagued many projects. Typically, when the SCP throughput problem happens, the systems engineer must ask each software unit developer to do whatever possible to minimize algorithm computation or computer usage to avoid the SCP throughput problem. Past attempts to avoid the SCP throughput problem forced the redesign of the Attitude Control Subsystem (ACS). Unfortunately, a redesign is rarely feasible since higher software demands would require the ACS to be designed from scratch because the ACS is at project's end.

A request to enlarge a sampling period with multiple RTIs to gain more throughput traffic involves a complete redesign of the control law to recover the unstable phase loss due to an extra sampling time delay in the attitude control feedback loops. The ACS is designed with a pre-determined sampling time with proper stablity margins and robustness. When the SCP thoughput problem occurs, it requies the ACS to cut down on sampling time, which cannot be done at this point.

There is a need for an innovative filtering technique to recover the unstable phase margin loss due to a time delay caused by the SCP throughput problem. There is also a need for a simple and effective filtering technique to solve the SCP throughput problem with reduced project time loses and reduced costs. Moreover, there is a need for a phase recovery filtering technique to overcome the SCP throughput shortage.

SUMMARY OF THE INVENTION

In one aspect of the present invention, a phase recovery filtering technique for SCP throughput shortage includes the steps of collecting throughput impact data at a lower sampling rate, examining current sampled-data control system stability margins; evaluating stability margins under a new slowed-down sampled-data system, modeling a sampler and a zero-order-hold device in a z-transform; inverting the slowed-down sample data device model as a new filter compensation; and recomputing the control system stability margins to verify a recovered phase loss.

In another aspect of the present invention, a method of correcting and compensating a digital signal for decreasing spacecraft (SCP) processing time in a satellite comprises the steps of: collecting data from an attitude control subsystem (ACS) sample-data; deriving a basic phase recovery filter structure; determining a sampling time change for each different program; associating a phase recovery filter with each different program; programming characteristics of each phase recovery filter.

In still another aspect of the present invention, a method of processing data from real time clock interrupts in a computer system includes steps of: collecting data at a first sampling frequency; determining system characteristics based on the data; and recalculating system characteristics at a second sampling frequency. The recalculating of system characteristics comprises passing the data at the first sampling frequency through a phase recovery digital filter and deriving the new phase and gain margin values.

In yet another aspect of the present invention, a method of decreasing the processing time in a spacecraft computer processor (SCP) on-board a spacecraft by using a phase recovery filtering technique to prevent SCP throughput shortage, includes the steps of: collecting a dispatch sequence at a rate of 8 real time interrupts (RTI); examining present sampled-data control system gain and phase; evaluating gain and phase under a 4 RTI and 8 RTI sampled-data systems and modeling a sampler and a zero-order-hold device in a z-transform approximation of a $1^{st}$ order approximation with $$\text{Sampler} + ZOH = \frac{z+1}{2z}$$

where $s=2(z-1)/(T(z+1))$ and is a Tustin transform where T=a sampling period of 4 RTI or 8 RTI. The method further includes the steps of inverting the slowed-down sample data device model, where the model is a phase recovery filter with:

$$PhaseRecoveryFilter = \frac{2z}{z+1};$$

and recomputing the control system stability margins of gain and phase to verify a recovered phase loss.

These and other features, aspects and advantages of the present invention will become better understood with reference to the following drawings, description and claims.

DETAILED DESCRIPTION OF THE INVENTION

Figure 1:
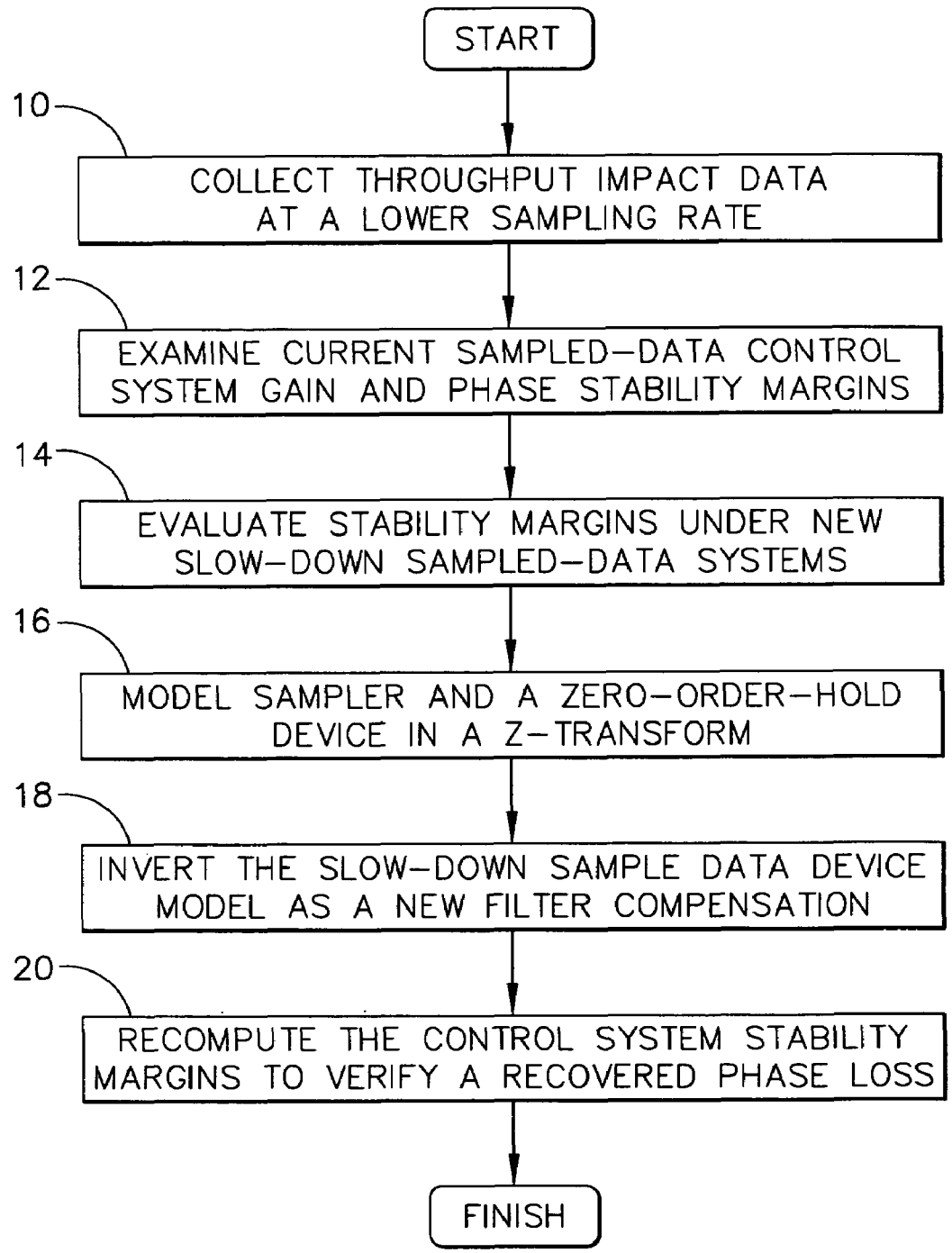
FIG. 1 is a flow chart showing a process of phase recovery filtering techniques for SCP throughput shortage of one embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, an embodiment of the present invention improves the operation of the on-board computer, or Spacecraft Central Processor (SCP), of a spacecraft or satellite. One embodiment provides phase recovery filtering techniques to alleviate processing shortages caused by limited available SCP throughput. One embodiment's filtering techniques operate in executed loops in the SCP. ACS designers usually spend years to design attitude control systems with proper stability margins and robustness under a pre-determined sampling time. When the SCP throughput problem occurs, the ACS may be required to cut down on sampling frequency. This often results in a major redesign and can take months to correct. The extra analysis work can involve linear control law re-design, multi-loop robustness analysis, and over one hundred case simulation re-runs. Currently, there is no way to get around this problem without redesigning the control system and running through the entire design and analysis cycle again.

In one embodiment of the present invention, a filtering technique recovers the unstable phase loss induced by the SCP throughput problem with no processing time loss. Any ACS control designer can simply plug this special phase recovery filter into a loop of instructions. The result will be an enlarged sampling time and comparable stability margins, resulting in conditions that cut down the SCP throughput shortage to the point where it behaves as though the SCP throughput problem never occurred. This embodiment of the method overcomes the processing time shortcomings effectively and efficiently by using special phase recovery filtering techniques. Past attempts of redesigning the ACS is avoided saving costs and time.

In one embodiment, the present filtering techniques were developed to recover the phase angle loss due to SCP throughput compensation. This special sample-data filter attacks the root of the problem and provides a simple fix so that months of control law redesign and analysis work can be avoided altogether. This embodiment of the invention starts by analyzing the sample-data ACS and its continuous domain first-order approximation to derive the basic phase recovery filter structure. Based on the sampling time change associated with each different SCP of each individual program, this phase recovery filter can be re-programmed and re-used with minimum effort.

The SCP executes various software units. A software unit called EXE CSU controls the overall task execution in the SCP. The EXE CSU maintains a table of all the procedures to be executed. On the other hand, a different software unit called a Mil-STD 1750A provides a layered architecture for various interruptions. In a Mil-STD 1750A the layers of processing include (1) background tasking when there is no interrupt and (2) interrupt handler layer having a RTI to handle main processing tasks in the SCP, a system support software interrupt, and input-output (I/O) interrupts.

The EXE CSU also manages, for example, increments, the spacecraft clock at every RTI it receives. The EXE CSU provides an interface to the ground to set or adjust the clock and to adjust a drift correction factor. A spacecraft configuration table for the EXE CSU initialization and fault protection support are also EXE CSU responsibilities.

One exemplary embodiment shown in FIG. 1 collects throughput impact data at a lower sampling rate, for example 8 RTI 10 and examines present sampled-data control system stability margins, for example gain and phase 12. Or put another way, the exemplary embodiment determines system characteristics based on the data or throughput impact data at a lower sampling rate. This embodiment further evaluates stability margins under new slowed-down sampled-data systems 14 and models a sampler and zero-order-hold in a z-transform 16. The new slowed down sampled data systems is at 8 RTI and 4 Hz. The slowed-down sample data device model is further inverted as a new filter compensation 18. Further control system stability margins are recomputed to verify a recovered phase loss 20. Where the phase recovery filtering techniques is a phase recovery filter that interrupts 8 RTI data as 4 RTI data.

Figure 2:
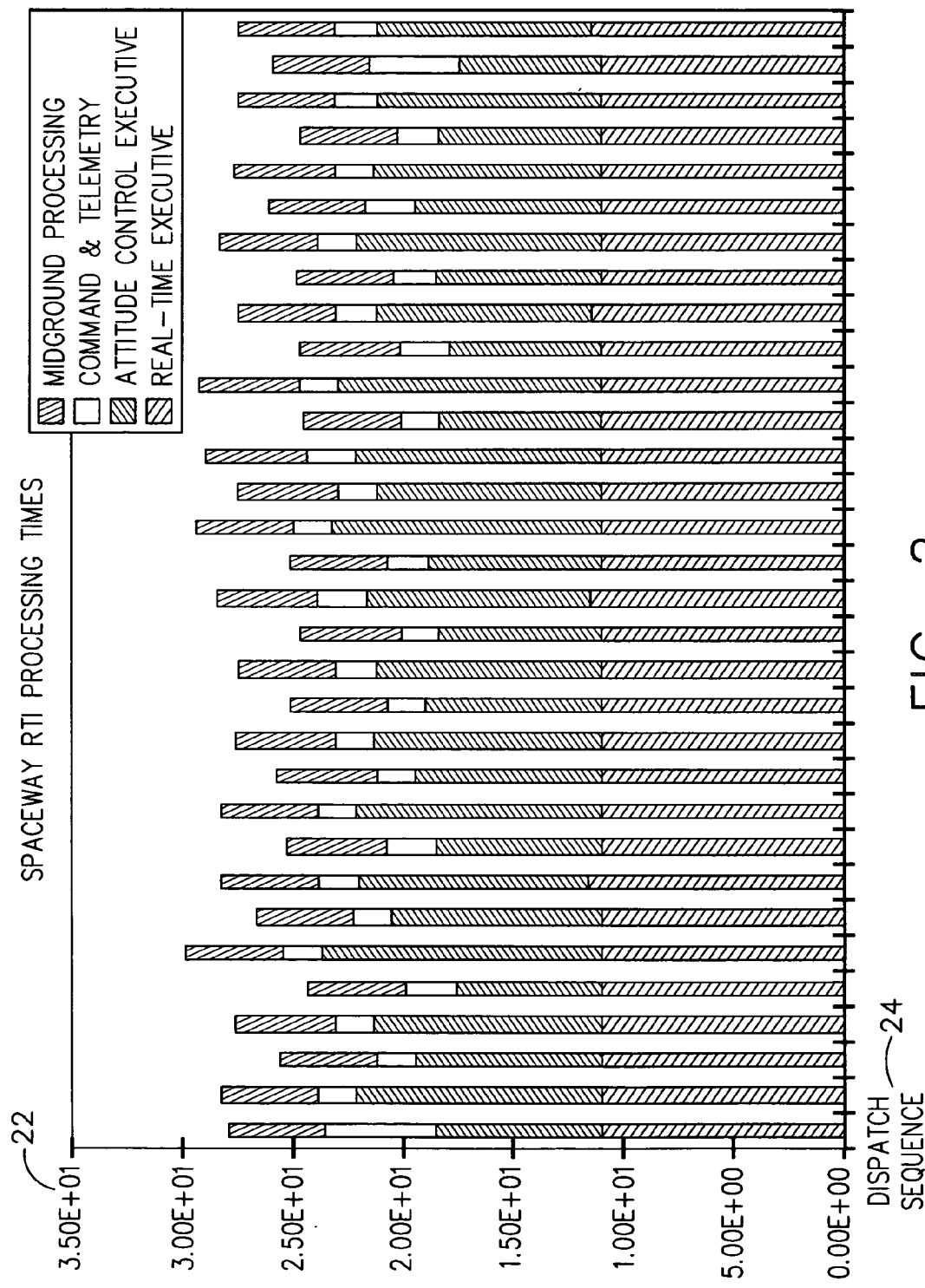
FIG. 2 is a chart showing real time clock interrupts (RTIs) in bar graph format of one embodiment of the present invention.

Based on the ACS execution, the ACS system engineer keeps track of a throughput allocation chart as shown in FIG. 2. The vertical axis on FIG. 2 is a percentage throughput under a current interrupt schedule 22 and the horizontal axis is a dispatch sequence 24 which may include midground processing, command and telemetry, attitude control executive and real-time executive. From this chart, a system engineer can estimate what percentage of throughput is used under the current interrupt schedule. In past attempts, the ACS uses 4 RTI for attitude control law computations guaranteeing particular stability margins, gain and phase. For example, the margin, gain and phase associated with the controller sampled at 4 RTI. Once the SCP throughput problem causes sampling time to decrease, it spills over to ACS and forces control law sampling at a longer period, say 8 RTI, the previously designed stability margins begin to be lost. A re-design effort can cost months of labor, schedule slip and unavoidable project revenue loss, unless the present phase recovery filtering technique is used.

Figure 3:
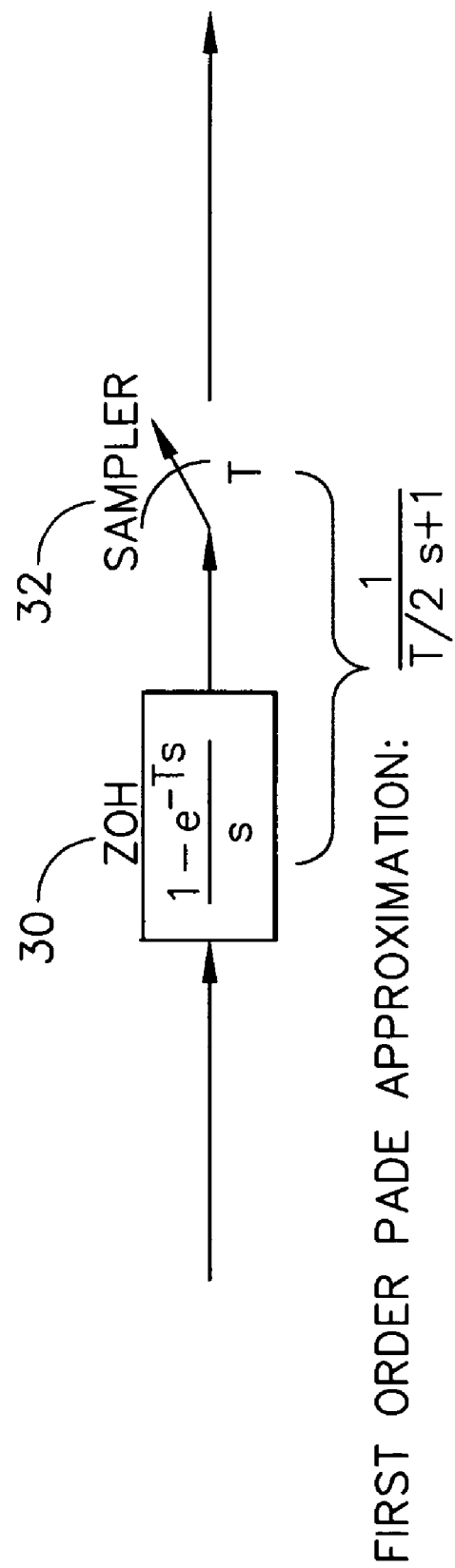
FIG. 3 is a diagram showing a zero-order-hold (ZOH) sampler approximation in a continuous domain of one embodiment of the present invention.

In one embodiment sampled-data control system is primarily different from a continuous system due to its sampler and hold device. The sampled-data control system will process the data in digital form according to the allocated sampling period. This sampler and hold device can be realized as a zero-order-hold (ZOH) 30 function and an ideal sampler 32 as shown in FIG. 3. Where $s=2(z-1)/(T(z+1))$, T is a sampling period and e is an effect or the natural base logarithm constant e=2.781828.

Figure 4:
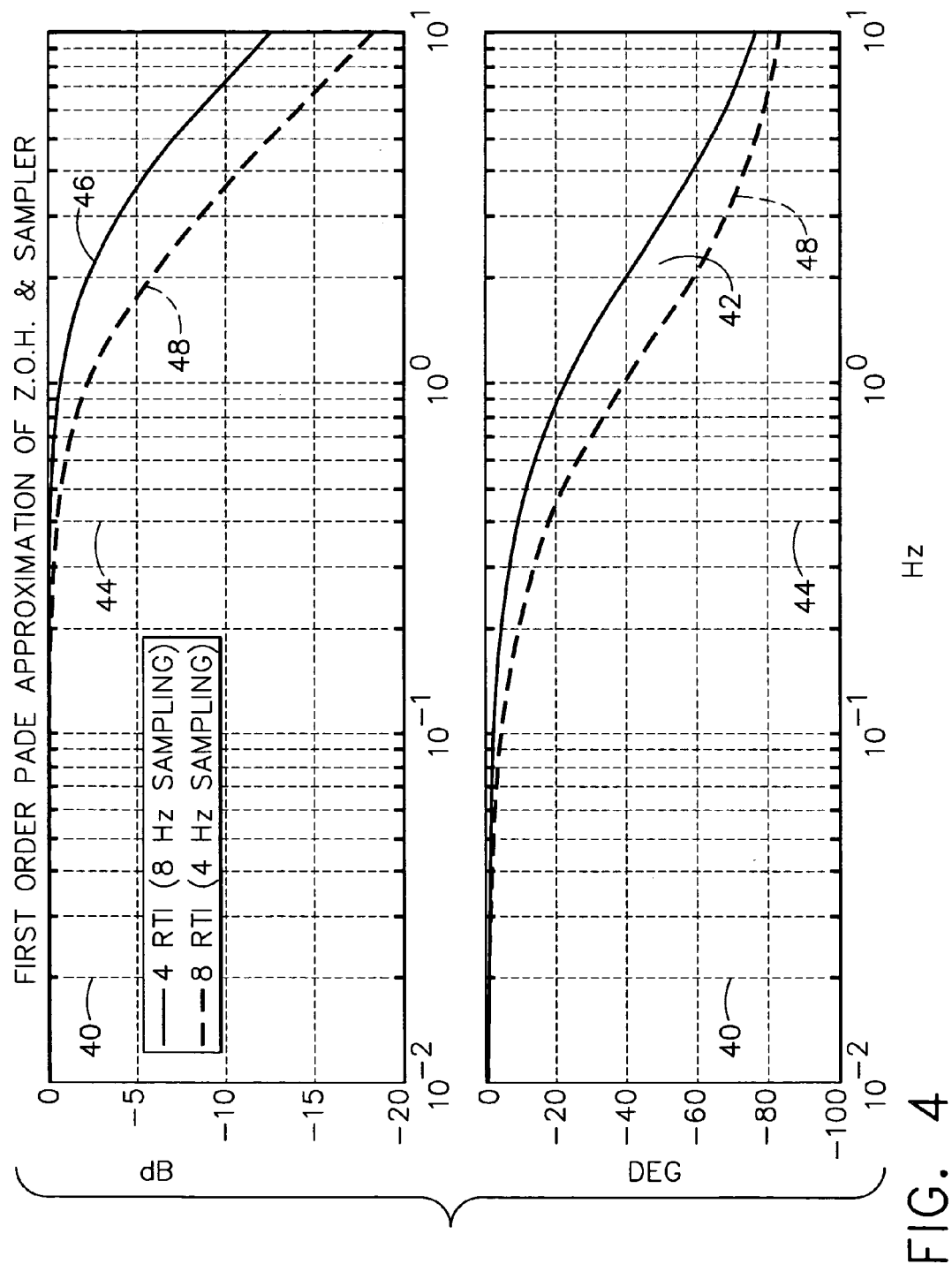
FIG. 4 is a graph showing a sampled-data chart difference between 4 RTIs and 8 RTIs of one embodiment of the present invention.

With this first order approximation of the fundamental sampled-data system, we know the following facts as shown in FIG. 4. The upper graph shows vertical axis values in decibels (dB) and horizontal values in hertz (Hz). The lower graph shows vertical axis values in degree(s) (deg) and the horizontal axis in Hz. Pure sampling effects at crossover, ~0.02 Hz 40, are minor, if we have only rigid body dynamics. There will be 10~20 deg 42 phase loss on structure modes beyond 0.3 Hz 44, which is nontrivial. The control system prefers 4 RTI or 8 Hz sampling, the solid curve 46, to maintain proper stability margins. FIG. 4 lower graph shows that after plotting the Bode plot in frequency domain, the ACS will lose about 10~20 deg 42 of phase angle due to a sampling time change from 4 RTI 44 to 8 RTI 48.

A z-transform approximation of the first-order approximation of the sampler and hold device is shown as follows via a Tustin transform where s= 2(z−1)/(T(z+1) and where T is the sampling period of 4RTI or 8 RTI:

$$Sampler + ZOH = \frac{z+1}{2z}$$

Figure 5:
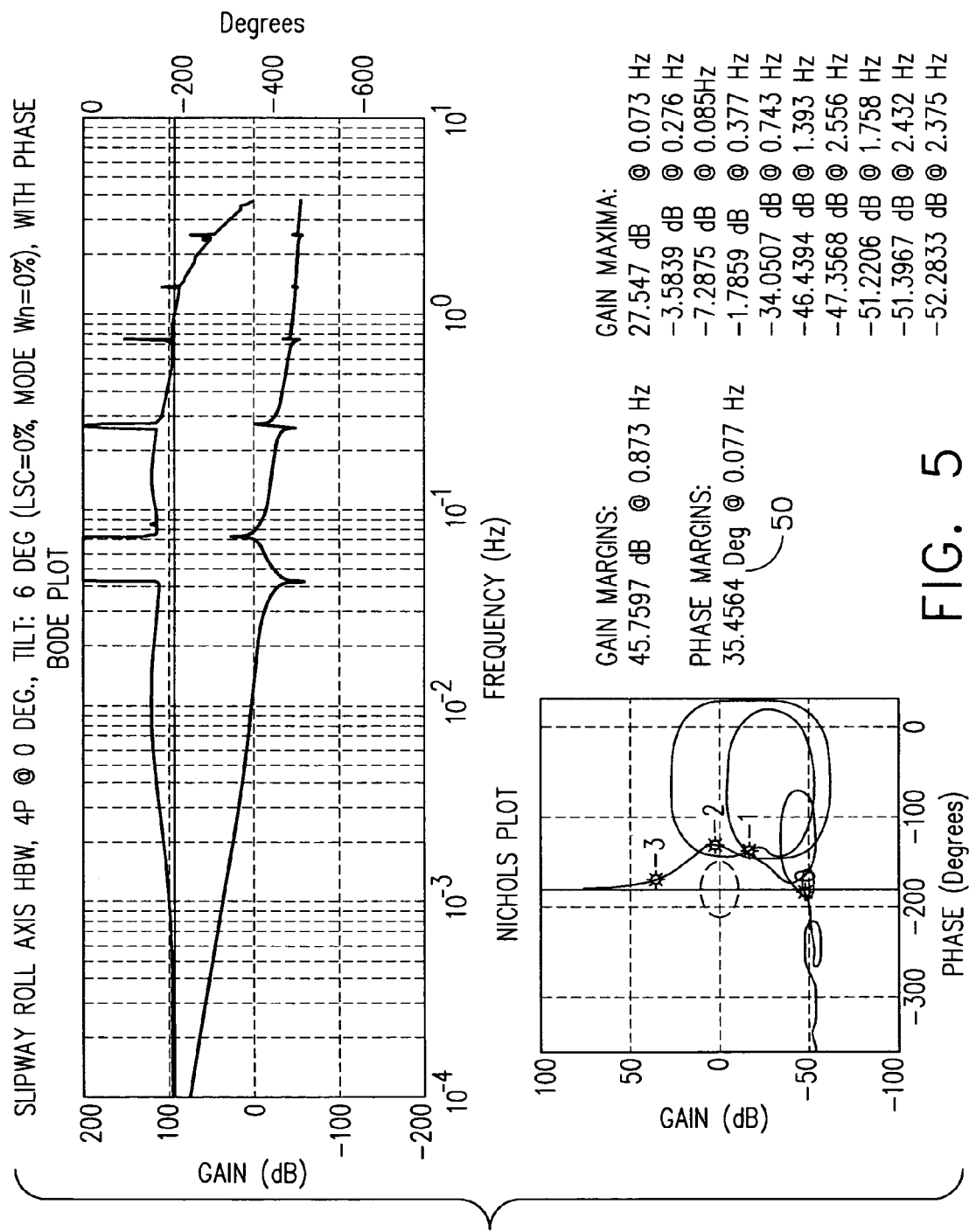
FIG. 5 are Bode and Nichols plots showing numerical examples at 4 RTI of one embodiment of the present invention.
Figure 6:
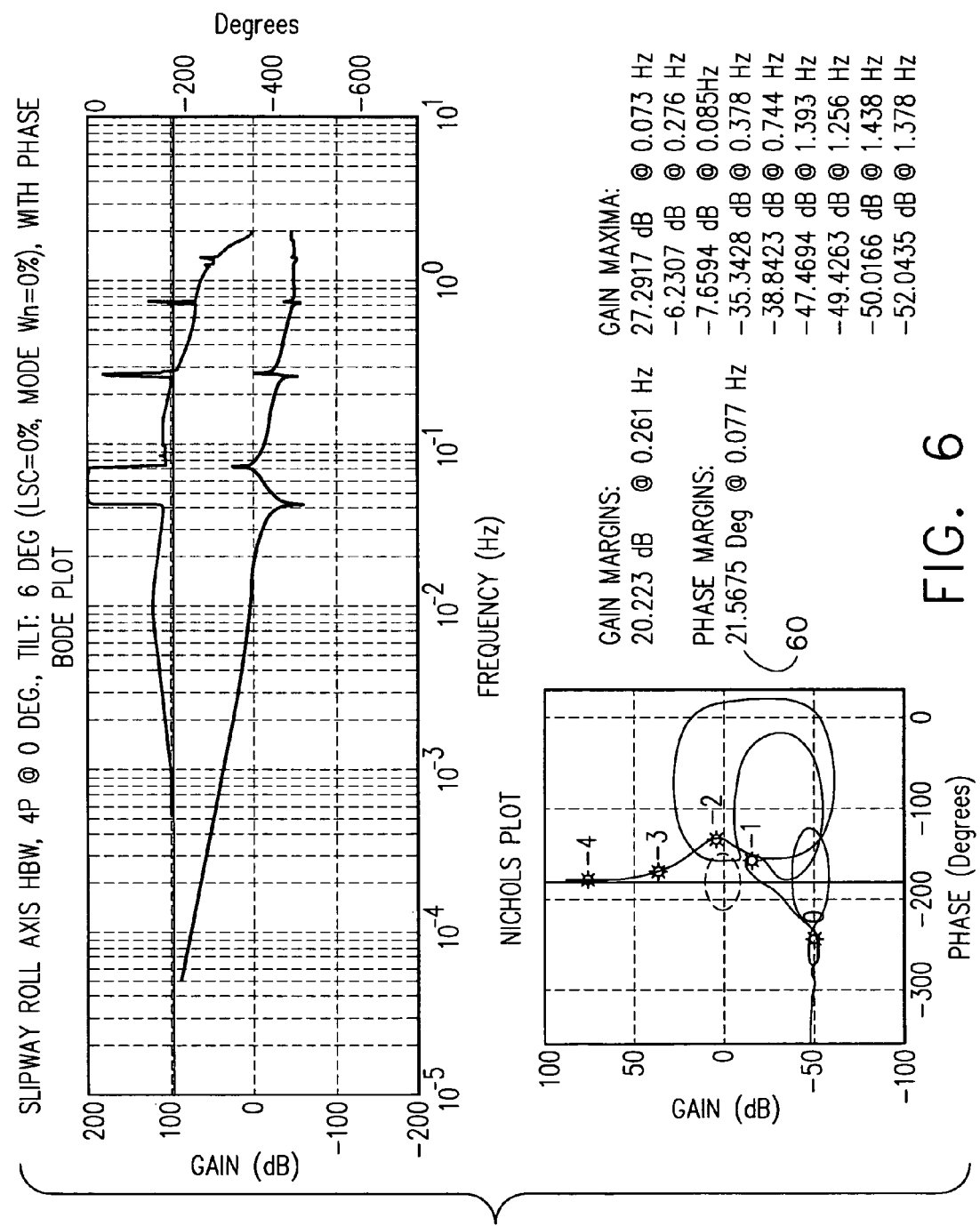
FIG. 6 are Bode and Nichols plots showing numerical examples at 8 RTI of one embodiment of the present invention.

A numerical example shows 4 RTI in FIG. 5 and 8 RTI shown in FIG. 6, and that the ACS loses about 14 degrees phase margin from 35 degrees 50 to 21 degrees 60 both values under the field "Phase Margins". The phase margin of 35 degrees violates a requirement of 30 degrees phase margin as a maximum value.

The phase recovery filter is a reciprocal of the first order sampler and hold approximation:

$$PhaseRecoveryFilter = \frac{2z}{z+1}$$

Figure 7:
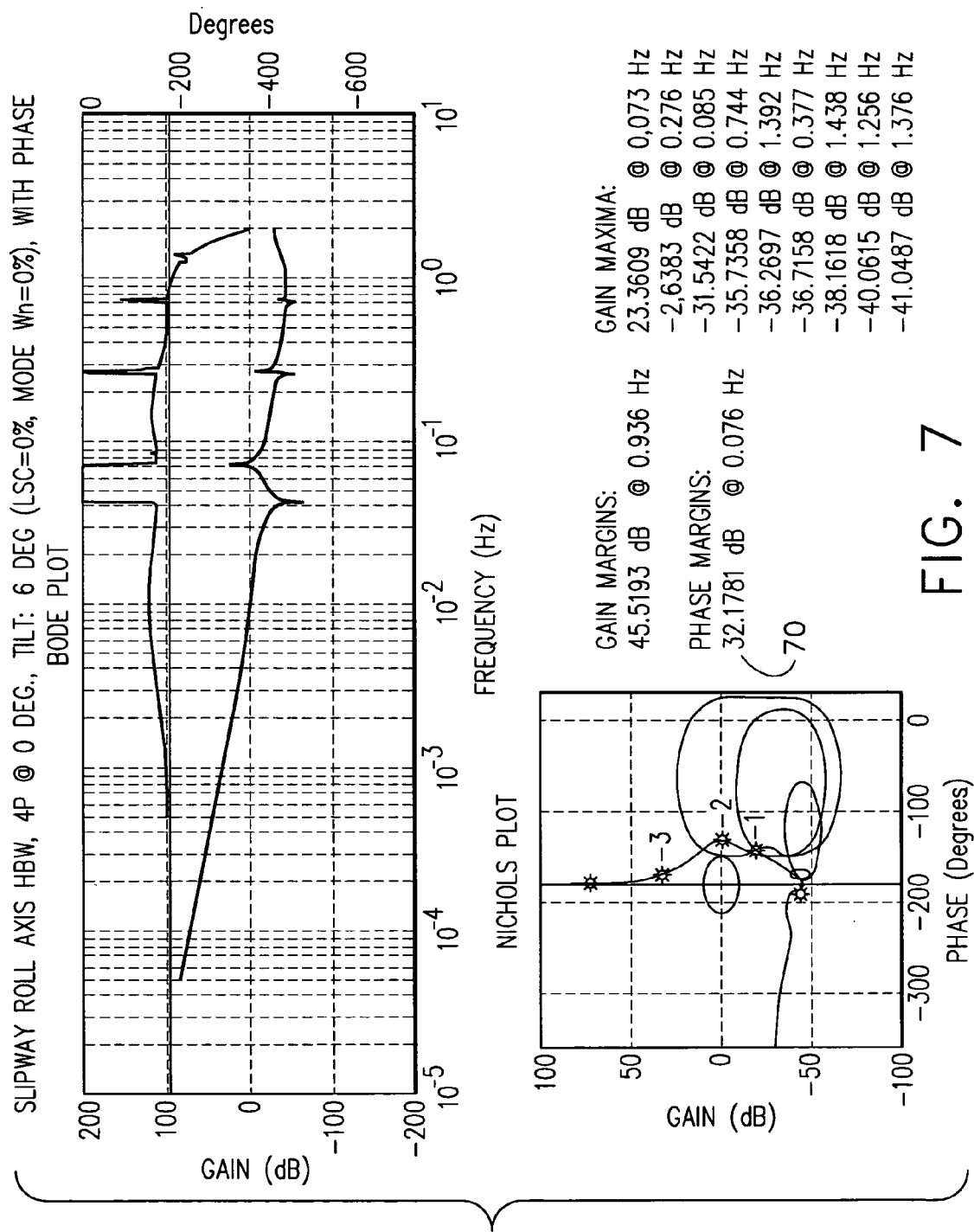
FIG. 7 are Bode and Nichols plots showing a recovered phase margin sampled at 8 RTI using phase recovery filtering of one embodiment of the present invention.

One feature of this reciprocal filter is that it simply takes back the loss coming from a longer sampling period of 8 RTI and recovers the phase stability margin as if the system is sampled at 4 RTI. The example in FIG. 7 shows the result of a phase margin of 32 degrees 70.

It should be understood, of course, that the foregoing relates to preferred embodiments of the invention and that modifications may be made without departing from the spirit and scope of the invention as set forth in the following claims.

We claim:

1. Phase recovery filtering techniques for a spacecraft computer processor (SCP) throughput shortage comprising the steps of:
   collecting throughput impact data at a lower sampling rate;
   examining current sampled-data control system stability margins;
   evaluating stability margins under a new slowed-down sampled-data system;
   modeling a sampler and a zero-order-hold device in a z-transform;
   inverting the slowed-down sample data device model as a new filter compensation; and
   recomputing the control system stability margins to verify a recovered phase loss.

2. The phase recovery filtering techniques for SCP throughput shortage of claim 1 wherein, the lower sampling rate is 8 RTI.

3. The phase recovery filtering techniques for SCP throughput shortage of claim 1 wherein, the stability margins are gain and phase.

4. The phase recovery filtering techniques for SCP throughput shortage of claim 1 wherein, the slowed down sample data system is 8 RTI and 4 Hertz.

5. The phase recovery filtering techniques for SCP throughput shortage of claim 1 wherein, the new filter compensation is a phase recovery filter.

6. The phase recovery filtering techniques for SCP throughput shortage of claim 5 wherein, the phase recovery filter is a reciprocal of a first order sampler and hold approximation.

7. The phase recovery filtering techniques for SCP throughput shortage of claim 1 wherein, the phase recovery filter interrupts 8 RTI data as 4 RTI data.

8. A method of phase recovery filtering techniques by collecting throughput data in a spacecraft computer processor (SCP) comprising the steps of:
   providing the throughput data from an attitude control subsystem (ACS);
   examining current sampled-data control system stability margins;
   evaluating stability margins under 8 RTI and 4 Hertz;
   modeling a sampler and a zero-order-hold device in a z-transform;
   inverting the stability margins as a new filter compensation; and
   recomputing the control system stability margins to verify a recovered phase loss.

9. The method of phase recovery filtering techniques of claim 8, wherein said phase recovery filter technique has an improved phase margin.

10. The method of phase recovery filtering techniques of claim 8, wherein a continuous domain first-order approximation of sample-data ACS is made.

11. The method of phase recovery filtering techniques claim 8, wherein a basic phase recovery filter structure is modeled from an approximation from the sampler and a zero-order-hold device.

12. The method of phase recovery filtering techniques of claim 8, wherein the phase recovery filter maintains continuous attitude control executive.

13. The method of phase recovery filtering techniques of claim 8, wherein the attitude control subsystem is a sampled-data control system.

14. The method of phase recovery filtering techniques of claim 13, wherein said sampled-data control system employs a sampler and hold device.

15. A method of processing data from real time interrupts in a computer system comprising steps of:
   collecting data at a first sampling frequency;
   determining system characteristics based on the data;
   evaluating stability margins under new slowed down sampled-data systems;
   modeling sampler and a zero-order-hold device in a z-transform and inverting the model data as a new filter compensation; and
   recomputing the control system stability margins to verify a recovered phase loss.

16. The method of processing data from real time interrupts of claim 15, wherein the sampler and hold device is realized as a zero-order-hold function.

17. The method of processing data from real time interrupts of claim 15, wherein said sampler and hold function generates a first-order approximation of the fundamental sampled-data system.

18. The method of processing data from real time interrupts of claim 15, wherein pure sampling effects at a crossover are minor with the first order approximation.

19. The method of processing data from real time interrupts of claim 15 wherein a 4 RTI (8 hz sampling) ACS is required to maintain proper stability margins.

20. A method of decreasing the processing time in a spacecraft computer processor (SCP) on-board a spacecraft by using a phase recovery filtering technique to prevent SCP throughput shortage, comprising the steps of:

collecting a dispatch sequence at a rate of 8 real clock-time interrupts (RTI);

examining present sampled-data control system gain and phase;

evaluating gain and phase under both a 4 RTI and an 8 RTI sampled-data systems;

modeling a sampler and a zero-order-hold device in a z-transform approximation of a first-order approximation with $$Sampler + ZOH = \frac{z+1}{2z}$$

where s=2(z−1)/(T(z+1)) and is a Tustin transform, where T=a sampling period of 4 RTI or 8 RTI, inverting the slowed-down sample data device model, the model is a phase recovery filter with $$PhaseRecoveryFilter = \frac{2z}{z+1}.$$

and recomputing the control system stability margins of gain and phase to verify a recovered phase loss.

21. The method of decreasing the processing time of an SCP in claim 20 wherein the dispatch sequence comprises midground processing, command and telemetry, attitude control executive and real-time executive.

22. The method of decreasing the processing time of an SCP in claim 20 wherein the phase recovery filter takes back the loss coming from a longer sampling period of 8 RTI.

23. The method of decreasing the processing time of an SCP in claim 20 wherein the phase recovery filter recovers the phase stability margin.

24. The method of decreasing the processing time of an SCP in claim 20 wherein a basic phase recovery filter structure is derived from an approximation by the sampler and a zero-order-hold device.

25. The method of decreasing the processing time of an SCP in claim 20 wherein the phase recovery filter can be reprogrammed.

* * * * *